July 2, 1940.  J. O. MACCABEE  2,206,230
VEHICLE WHEEL
Filed Nov. 14, 1936    2 Sheets-Sheet 2
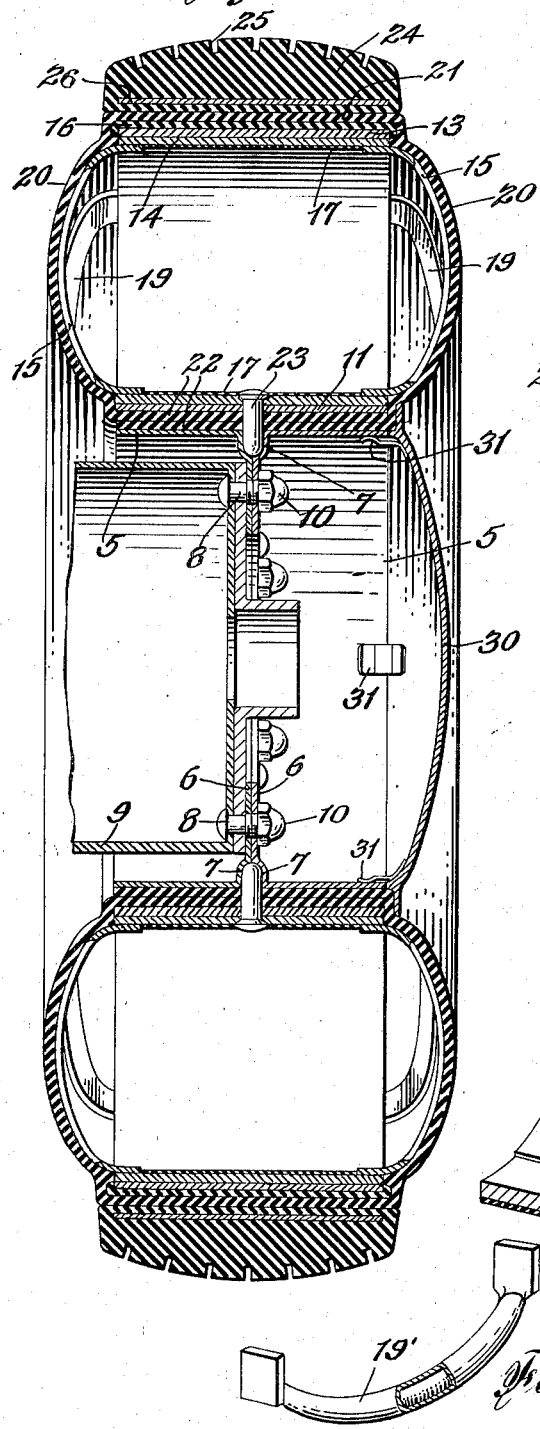
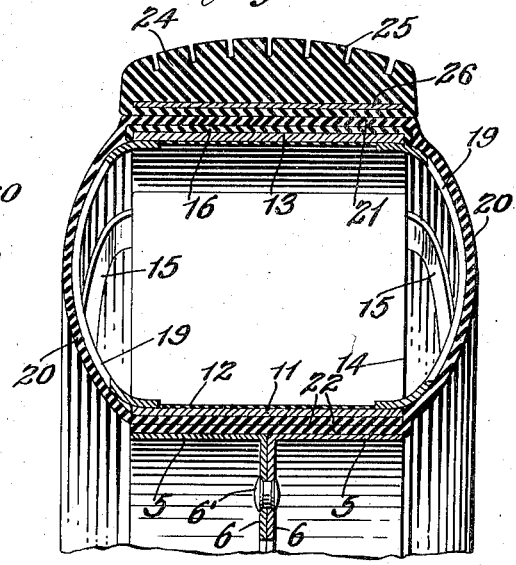
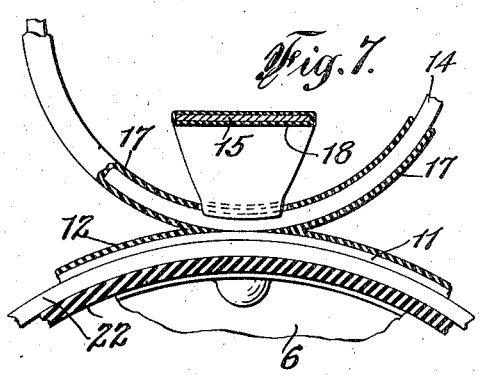
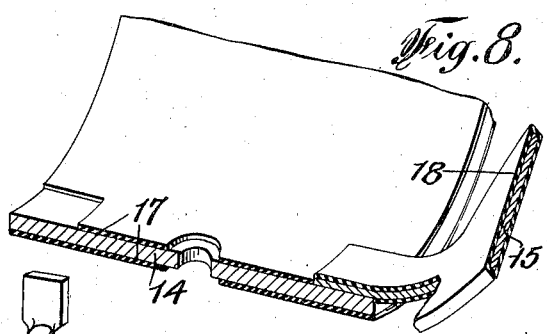
INVENTOR
Joseph O. Maccabee,
BY M. C. Siddane
ATTORNEY Patented July 2, 1940

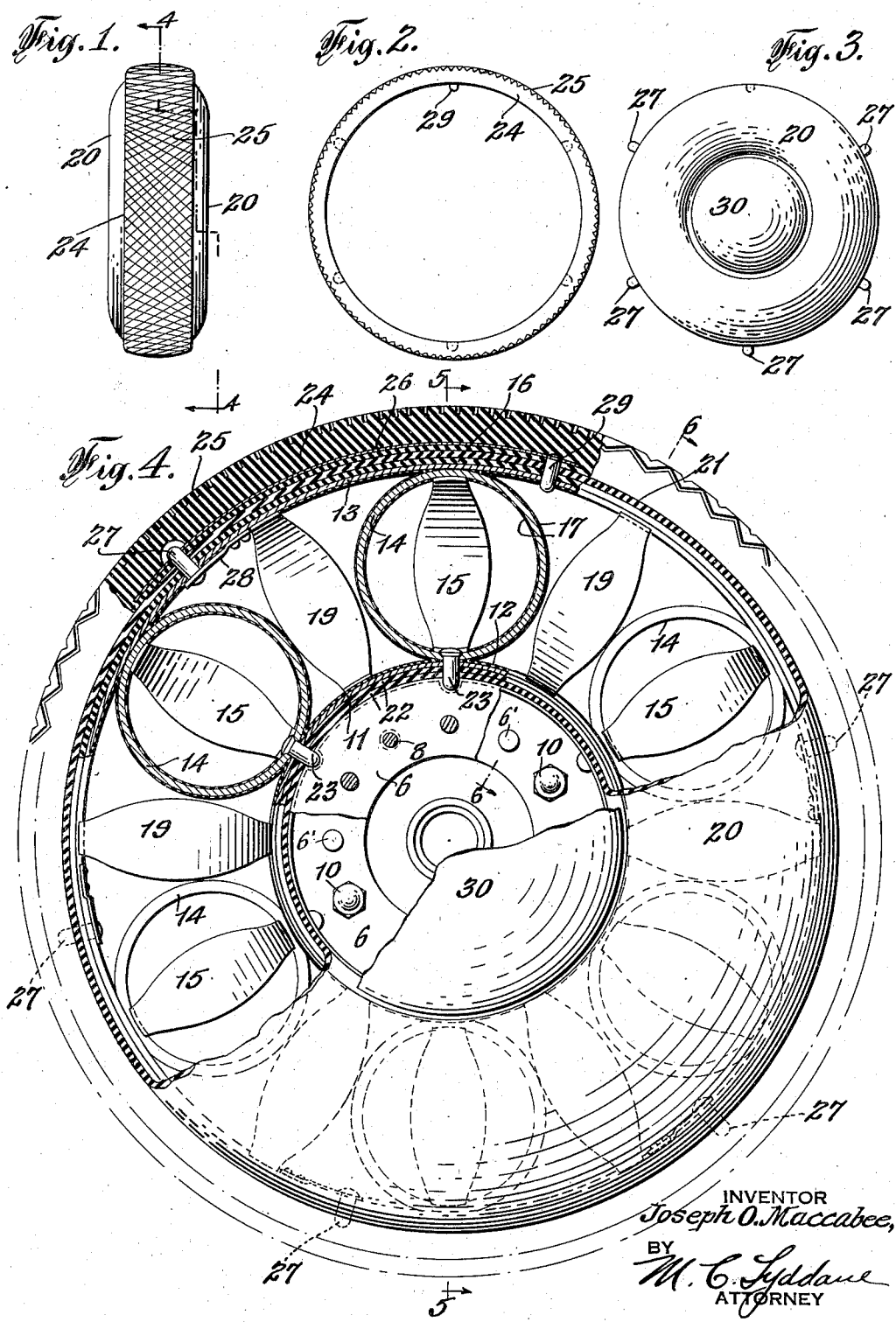

2,206,230

UNITED STATES PATENT OFFICE 2,206,230

VEHICLE WHEEL

Joseph Ogdin Maccabee, New York, N. Y.

Application November 14, 1936, Serial No. 110,809

8 Claims. (Cl. 152—253)

This invention relates to vehicle wheels and has for its primary object to provide a wheel for automobiles and other vehicles of such construction that each wheel will independently act to effectively absorb all road shocks or jars and prevent transmission thereof through the wheel axle to the vehicle body.

It is a more particular object of my invention to provide a resilient wheel for vehicles of the type in which a plurality of metallic cushioning units are positioned between the wheel hub and tire carrying rim, wherein effective means is provided for minimizing liability of crystallization and breakage of the metallic cushioning units and rim.

It is also an important object of the invention to provide a novel assemblage and arrangement of the metallic cushioning units between the wheel hub and rim whereby the driving torque will be properly distributed with a minimum of stress upon the individual cushioning units.

It is also a further object of my invention to provide a vehicle wheel of the type above stated which is rugged and substantial in construction and will efficiently operate under heavy loads, and in which simple and reliable means is provided for demountably securing a solid rubber tire tread upon the wheel rim.

With the above and other objects in view, the invention consists in the improved vehicle wheel and in the form, construction and relative arrangement of its several parts, as will be hereinafter more fully described, illustrated in the accompanying drawings, and subsequently incorporated in the subjoined claims.

In the drawings wherein I have shown one simple and practical embodiment of the invention and in which similar reference characters designate corresponding parts throughout the several views:

Fig. 1 is an edge view of a vehicle wheel embodying the present invention.

Fig. 2 is a side elevation of the demountable tire.

Fig. 3 is a similar view of the body of the wheel, the tire being removed.

Fig. 4 is a sectional view taken substantially on the line 4—4 of Fig. 1.

Fig. 5 is a vertical sectional view taken on the line 5—5 of Fig. 4.

Fig. 6 is a transverse sectional view taken on the line 6—6 of Fig. 4.

Fig. 7 is a detail fragmentary elevation, certain of the parts being shown in section.

Fig. 8 is a detail fragmentary perspective view.

Fig. 9 is a perspective view showing a modified form of one of the cushioning elements.

In the embodiment of the invention which I have selected for the purpose of illustration the wheel hub consists of two similar sections 5. Each of these hub sections has an inwardly extending annular wall or flange 6 at one of its ends. At circumferentially spaced intervals this flange or wall, at its juncture with the cylindrical wall of the hub section, is indented to provide a recess indicated at 7.

The end flanges 6 of the hub sections are adapted to be arranged in abutting contact and are apertured to receive the stud bolts 8 projecting from the end wall of the brake drum. The threaded ends of said bolts receive the nuts 10, whereby the two hub sections are rigidly secured in connected relation with the brake drum.

A metal ring 11 surrounds the hub sections 5 in spaced concentric relation thereto and preferably has a heat resistant facing sheet 12 vulcanized to its outer surface.

A resilient metal supporting ring 13 is concentrically spaced from the metal ring 11, and between said rings the metallic cushioning units are arranged. As herein shown these units include the resilient cylindrical members 14, open at their opposite ends, and extending across the entire width of the rings 11 and 13. At the opposite ends of these members 14 the outwardly bowed resilient members 15 are arranged and have their opposite ends projecting inwardly and in contact with the inner faces of the members 14 as clearly seen in Fig. 5 of the drawings. At such points of contact of the members 14 and 15 they are securely welded together, while the cylindrical members 14 are similarly welded to the rings 11 and 13. Preferably although not necessarily, the tread supporting ring 13 also has heat resistant material 16 vulcanized to the inner and outer faces thereof. Likewise, as a protective medium and to reduce wear, the inner and outer surfaces of the cylindrical cushioning members 14 are covered with heat resistant material as indicated at 17. If desired, the transversely yieldable cushioning elements 15 may also be sheathed in a heat resistant material, as indicated at 18 in Fig. 7 of the drawings.

Between the sets of cushioning elements 14 and 15 the transversely yieldable resilient elements 19 are arranged and have their ends securely welded to the rings 11 and 13 and if desired may also be sheathed in a heat resistant material. These elements are somewhat similar in form to the cushioning elements 15, their function and purpose being to better equalize the distribution of the driving torque from the wheel hub to the tread supporting ring 13 and thereby relieve the connections between the elements 14 and 15 and the rings 11 and 13 of excessive stress.

The opposite sides of the wheel body are closed by heavy rubber walls 20 of concavo-convex form with the inner surfaces of which the cushioning elements 15 and 19 are normally in contact. These side walls at their outer edges are integrally connected by the cylindrical wall 21 which is recessed on its inner side to receive the tire supporting ring 13. At their inner edges each of these rubber side walls has an integral cylindrical hub wall 22. These walls are of relatively different diameters, said hub walls being in telescoped relation and the inner wall fitting snugly over the cylindrical walls of the hub sections 5 while the outer hub extension 22 of one of said side walls is in contact with the inner face of the metal ring 11.

The ring 11, each of the cylindrical elements 14, and the hub extensions 22 of the side walls 20 are provided with registering openings which receive the studs or pins 23 suitably fixed at their outer ends to the elements 14 and engaging at their inner ends in the sockets formed by the mating recesses 7 in the walls 6 of the hub sections 5.

In the illustrated construction I provide a solid rubber tire 24 having a suitably formed tread 25. Within the body of the tire and adjacent to the inner face thereof an annular resilient metal reinforcing ring 26 is incorporated. This ring and the inner portion of the tire are provided at circumferentially spaced points with suitable openings to receive the spring pressed locking pins 27 which are radially movable through openings in the supporting ring 13 and its rubber facing sheet 16 and the cylindrical wall 21. The pins 27 may be mounted on the ring 13 in various ways, but as herein shown, I have provided the leaf spring 28 secured at one of its ends to the inner face of the ring 13 and attached at its other end to the inner end of the pin 27. The outer ends of these pins are rounded or bevelled so that when the tire is applied they may be easily forced inwardly until the openings in the tire 24 and reinforcing ring 26 are in proper register therewith.

In order to properly locate the openings to receive the locking pins 27 in mounting or applying the tire, I provide the locating pin or stud 29 fixed to the ring 26 and projecting inwardly from the inner face of the tire 24. This pin has a convex inner end and is adapted for engagement through suitably formed openings in the cylindrical rubber wall 21 connecting the side walls 20 and in the tire supporting ring 13, as clearly shown in Fig. 4 of the drawings.

After the body of the wheel has been properly assembled, the hub sections 5 are inserted from opposite sides so that the inner ends of the pins 23 are received in the sockets formed by the recesses 7. The abutting end walls 6 of the hub sections are then connected with each other by rivets or other suitable fastening elements indicated at 6', after which the wheel hub is mounted on the bolts 8 and rigidly fixed to the brake drum by the nuts 10. Assuming that the tire 24 has been mounted and properly locked to the supporting ring 13, a hub cover plate or cap 30 of any desired ornamental form is then pressed against the inner marginal portion of the outer side wall of the wheel. This plate may carry suitable spring clips indicated at 31 or any other desired means for detachably retaining the same in its applied position.

In Fig. 9 of the drawings, I have illustrated an alternative form for the torque distributing elements 15 and 19. Thus instead of consisting of a flat resiliently yieldable plate or strip, these elements may be of solid cylindrical, resilient steel, sheathed in heat resistant material, as shown at 19'. Such construction in certain embodiments might be found somewhat more effective in resisting distorting strains and yet adequately combining the requisite cushioning and torque transmitting functions.

From the foregoing description considered in connection with the accompanying drawings it is believed that the construction, manner of operation, and several advantages of my improved vehicle wheel will be readily understood. It will be seen that such a wheel construction is very rugged and durable, and yet will operate satisfactorily under heavy loads and severe conditions to cushion or absorb road shocks or jars. Since this construction permits the use of a solid rubber tire instead of the usual pneumatic tire, the danger, annoyance, inconvenience and expense incident to punctures and blowouts is obviated. The various resiliently yieldable cushioning elements being themselves individually encased in heat resistant material and protected by the heavy rubber side walls of the wheel body are practically insured against structural deterioration for the life of the wheel. The cooperative action between the several cushioning elements 24, 26, 13, 14, 15 and 19 and the side walls 20 of the wheel, with the extensive transverse bearing surface between the members 14 and the metal rings 11 and 13, results in the maintenance of accurate alignment between the tire supporting ring and the wheel hub under all driving conditions.

I have herein shown and described a structural embodiment of my present invention, which is thought to be entirely practical. However, in further development, various changes may be found desirable in the arrangement and relative proportions of the several parts as well as in the structural form thereof. Accordingly, it is to be understood that I reserve the privilege of resorting to all such legitimate modifications in the present disclosure, as may be fairly comprehended within the spirit and scope of the invention as claimed.

I claim:

1. In a vehicle wheel, a hub, a resilient tire supporting ring, opposite resiliently yieldable side walls having telescoped hub extensions at their inner edges surrounding the wheel hub and connected at their outer edges with said tire supporting ring, shock absorbing means interposed between the hub extensions of said side walls and said ring, and a common means connecting the shock absorbing means and said extensions of the side walls with the wheel hub.

2. In a vehicle wheel, a hub, a resilient tire supporting ring, opposite side walls of resilient material, having telescoped tubular extensions at their inner edges surrounding the wheel hub, and a continuous cylindrical wall integrally connecting said side walls at their outer edges, said cylindrical wall surrounding the tire supporting ring, shock absorbing means interposed between the tire supporting ring and the telescoped extensions of said side walls, and means securing said extensions and the shock absorbing means against circumferential or axial movement with respect to the wheel hub.

3. In a vehicle wheel, a resilient tire supporting ring, resiliently yieldable side walls attached at their outer edges to said ring and having telescoped tubular extensions at their inner edges, a metal hub fitted within said telescoped extensions, and means connecting said extensions with each other and to said hub to prevent independent relative axial or circumferential movement thereof and unite the same in a composite hub unit.

4. In a vehicle wheel, a resilient tire supporting ring, relatively yieldable side walls attached at their outer edges to said ring and having telescoped tubular extensions at their inner edges, complementary metallic hub sections fitted within said telescoped extensions, means rigidly connecting said hub sections with each other, a metal ring surrounding said tubular extensions of the side walls, said hub sections being formed to provide circumferentially spaced sockets, and radially disposed pins extending through said metal ring and the telescoped extensions of said side walls and engaged at their inner ends in said hub sockets to unite the connected parts and prevent relative axial or circumferential movement thereof.

5. In a vehicle wheel, resiliently yieldable side walls integrally connected at their outer edges by a cylindrical peripheral wall having its inner face recessed, a resilient metal tire supporting ring positioned in said recess, and a wheel hub including integrally formed telescoped hub extensions on the inner edges of said side walls.

6. In a vehicle wheel, resiliently yieldable side walls integrally connected at their outer edges by a cylindrical peripheral wall having its inner face recessed, a resilient metal tire supporting ring positioned in said recess, a wheel hub including integrally formed telescoped hub extensions on the inner edges of said side walls, a metal ring surrounding said hub extensions of the side walls, and radially and axially yieldable cushioning elements interposed between said metal ring and the tire supporting ring, the latter cushioning elements engaging and sustaining said yieldable side walls in normal cross-sectional form.

7. In a vehicle wheel, resiliently yieldable side walls integrally connected at their outer edges by a cylindrical peripheral wall having its inner face recessed, a resilient metal tire supporting ring positioned in said recess, a demountable resilient tread directly contacting the outer face of said cylindrical wall, a wheel hub including integrally formed telescoped hub extensions on the inner edges of said side walls, a metal ring surrounding said hub extensions of the side walls, and radially and axially yieldable cushioning elements interposed between said metal ring and the tire supporting ring, the latter cushioning elements engaging and sustaining said yieldable side walls in normal cross-sectional form.

8. In a vehicle wheel, a hub, a tire supporting ring, a plurality of circumferentially spaced cylindrical tubular cushioning members of substantially the same axial length as said hub and directly connected at diametrically opposite points to the hub and ring to yield circumferentially thereof in response to radial thrust, additional axially yieldable cushioning members extending diametrically across each end of each tubular member and directly fixed thereto, and a second series of axially yieldable cushioning members arranged between said spaced tubular members and connected with said hub and ring.

JOSEPH OGDIN MACCABEE.